United States Patent
Wood et al.

(10) Patent No.: US 6,760,864 B2
(45) Date of Patent: Jul. 6, 2004

(54) DATA PROCESSING SYSTEM WITH ON-CHIP FIFO FOR STORING DEBUG INFORMATION AND METHOD THEREFOR

(75) Inventors: Michael C. Wood, Pflugerville, TX (US); Jay A. Hartvigsen, Austin, TX (US); James M. Sibigtroth, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 562 days.

(21) Appl. No.: 09/788,815

(22) Filed: Feb. 21, 2001

(65) Prior Publication Data

US 2002/0116663 A1 Aug. 22, 2002

(51) Int. Cl.⁷ .............................. G06F 11/00; G06F 9/44
(52) U.S. Cl. .............................. 714/30; 714/31; 714/39; 717/124; 717/127; 717/128
(58) Field of Search .............................. 714/30, 31, 35, 714/39, 733; 717/124, 127, 128

(56) References Cited

U.S. PATENT DOCUMENTS

| | | | | |
|---|---|---|---|---|
| 5,058,114 A | * | 10/1991 | Kuboki et al. ................ | 714/38 |
| 5,737,516 A | * | 4/1998 | Circello et al. ............... | 714/38 |
| 6,035,422 A | * | 3/2000 | Hohl et al. ................... | 714/35 |
| 6,142,683 A | * | 11/2000 | Madduri ...................... | 717/128 |
| 6,205,560 B1 | * | 3/2001 | Hervin et al. ................ | 714/34 |
| 6,286,114 B1 | * | 9/2001 | Veenstra et al. .............. | 714/39 |
| 6,314,530 B1 | * | 11/2001 | Mann .......................... | 714/38 |
| 6,609,247 B1 | * | 8/2003 | Dua et al. ................... | 717/128 |
| 6,615,368 B1 | * | 9/2003 | Dunlap ........................ | 714/30 |
| 6,615,370 B1 | * | 9/2003 | Edwards et al. .............. | 714/45 |

OTHER PUBLICATIONS

Copy of related U.S. patent application SC10980TH entitled, "Data Processing System Having An On–Chip Background Debug System Having An On–Chip Background Debug System and Method Therefor" (17 pgs.), filed on Feb. 16, 2001.

* cited by examiner

*Primary Examiner*—Robert Beausoliel
*Assistant Examiner*—Emerson Puente
(74) *Attorney, Agent, or Firm*—Daniel D. Hill

(57) ABSTRACT

A debug module (20) is provided which allows a developer to capture three types of debug information. The three types of debug information are: change-of-flow addresses, CPU data, and current instruction addresses. The debug information is captured in an on-chip debug FIFO memory (30) during program development. The debug information is provided to an external host via a serial communication interface (14) for post-processing and analysis. Storing and retrieving program information in this way is useful in microcontrollers that do not provide external access to address and data bus signals.

20 Claims, 3 Drawing Sheets

DATA PROCESSING SYSTEM WITH ON-CHIP FIFO FOR STORING DEBUG INFORMATION AND METHOD THEREFOR

RELATED APPLICATION

This is related to United States Patent Application having docket number SC10980TH, entitled "DATA PROCESING SYSTEM HAVING AN ON-CHIP BACKGROUND DEBUG SYSTEM AND METHOD THEREFOR," filed on even date herewith, and is incorporated herein by reference and assigned to the current assignee hereof.

FIELD OF THE INVENTION

The present invention relates generally to data processing systems, and more particularly, to a data processing system with an on-chip debug FIFO capable of storing change-of-flow addresses, data values, or current instruction addresses.

BACKGROUND OF THE INVENTION

In previous microcontrollers, program debugging was primarily based on in-circuit emulators and logic analyzers which relied on access to address and data signals on external pins. In older microcontroller systems it was possible to collect debug information by monitoring address, data, and control signals with external equipment such as a logic analyzer or a bus state analyzer. With modem advances in silicon processing technology, the silicon area and cost of bonding pads for external pins has risen dramatically relative to the cost of internal logic. It is now desirable to produce microcontroller integrated circuits which do not have external pins for address and data signals, but this presents a problem for product development and program debugging.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Generally the present invention provides a debugging module in a data processing system using a first-in, first-out (FIFO) memory to store certain debug related information. The debug related information includes, for example, change-of-flow addresses, central processing unit (CPU) data values, and current instruction addresses. The data processing system does not have dedicated pins for monitoring internal address and data buses. The debugging module includes a FIFO for temporarily storing the debug information before providing it to an external system via a serial communication interface. The debugging module operates autonomously of the CPU and allows real time program debugging in data processing systems that do not have dedicated pins for monitoring internal address and data buses.

As used herein, the term "bus" is used to refer to a plurality of signals or conductors which may be used to transfer one or more various types of information, such as data, addresses, control, or status. The term "assert" is used when referring to the rendering of a signal, status bit, or similar apparatus into its logically true state. The term "negate" or "deassert" is used when referring to the rendering of a signal, status bit, or similar apparatus into its logically false state. If a signal (or status bit, etc.) is active high, the logically true state is a logic level one, and the logically false state is a logic level zero. If a signal (or status bit, etc.) is active low, the logically true state is a logic level zero, and the logically false state is a logic level one. Also, "high" may be used to refer to a logic level one while "low" may be used to refer to a logic level zero.

Figure 1:
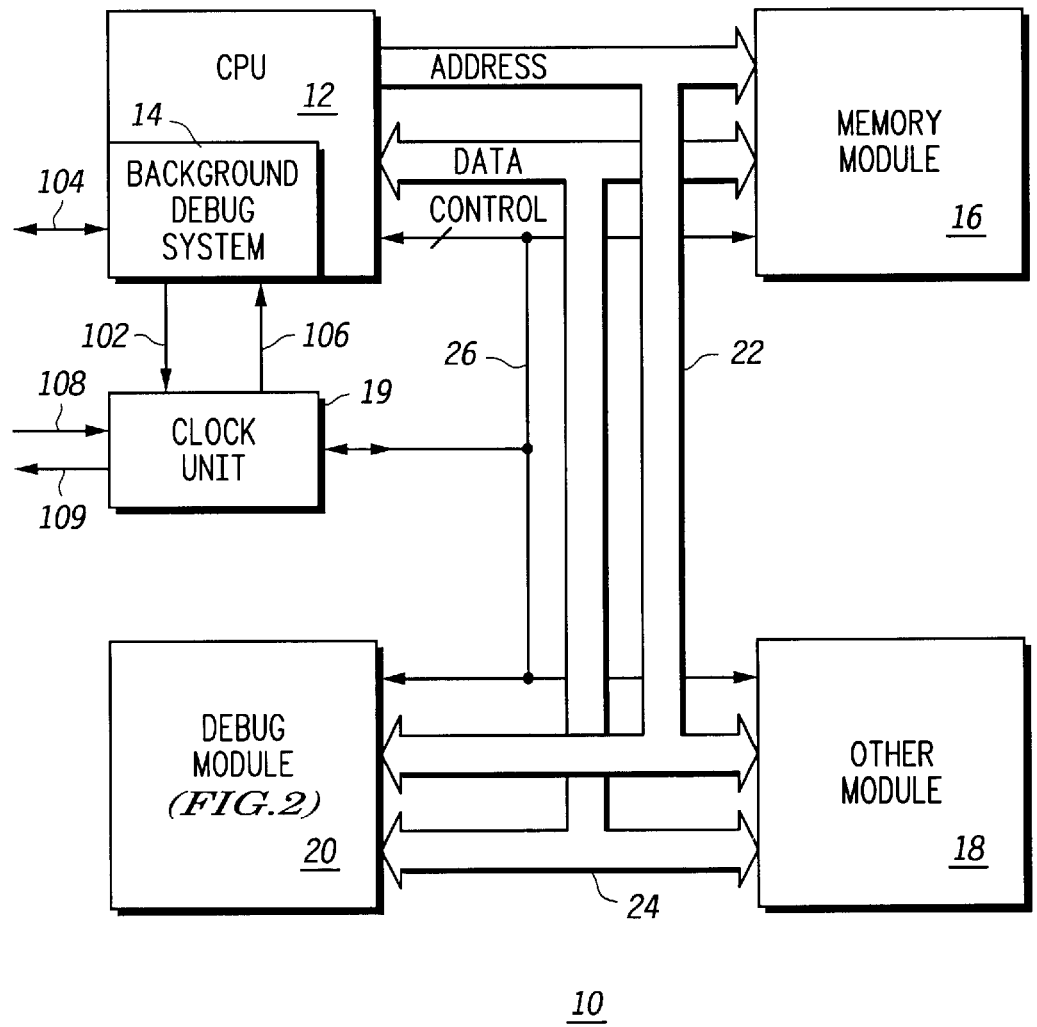
FIG. 1 illustrates, in block diagram form, a data processing system in accordance with the present invention.

FIG. 1 illustrates, in block diagram form, a data processing system 10 in accordance with one embodiment of the present invention. Data processing system 10 can be any processing system such as a microcontroller, microprocessor, digital signal processor (DSP), or the like. Data processing system 10 includes CPU 12, clock unit 19, memory module 16, other module 18, debug module 20, internal address bus 22, internal data bus 24, and control signals 26. CPU 12 includes a background debug system (BDS) 14. BDS 14 includes a serial background communication interface 104. Internal data bus 24, internal address bus 22, and control signals 26 are coupled between CPU 12 and each of the peripheral modules on data processing system 10. Clock unit 19 is coupled to CPU 12 via control signals 26 and to BDS 14 via signals 102 and 106. Clock unit 19 also includes interface signals 108 and 109 for coupling to an oscillator circuit (not shown).

In operation, CPU 12 receives and executes instructions from a software program stored in memory module 16 via data bus 24. CPU 12 then directs or uses other resources of the data processing system to perform certain tasks. Memory module 16 may be any type of memory including, but not limited to, static random access memory, dynamic random access memory, or any type of non-volatile memory, such as for example, flash or EEPROM. Other module 18 may include one or more additional modules, such as for example, another memory module, an analog-to-digital converter, a timer module, a serial communications module, for example, a CAN module, a general purpose input/output module, or the like. Debug module 20 is illustrated in greater detail in FIG. 2 and allows for program debugging.

Figure 3:
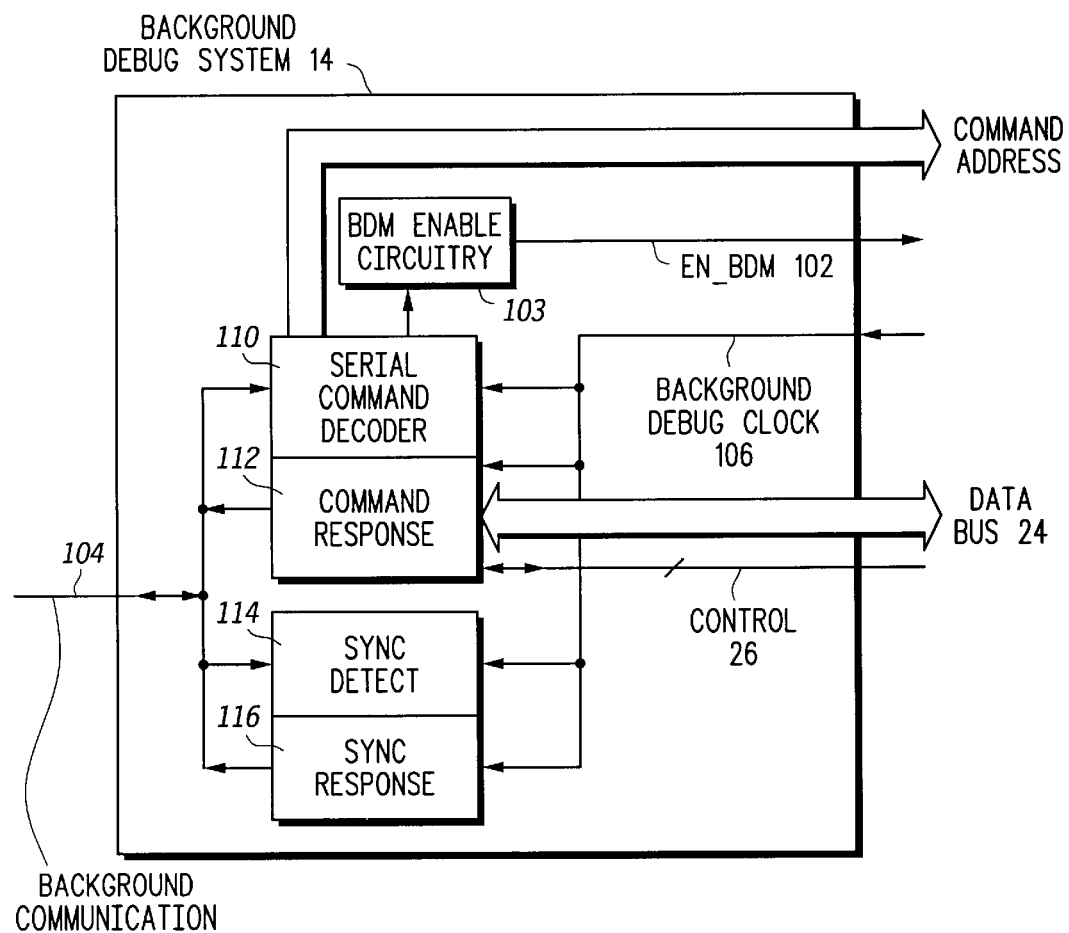
FIG. 3 illustrates, in block diagram form, the background debug system of FIG. 1.

Clock unit 19 is coupled to background debug system 14 via EN_BDM 102 and background debug clock 106 (see FIG. 3). Signals 108 and 109 provide interface signals to external oscillator components (not shown). Clock unit 19 also receives and provides control signals via control signals 26. For example, clock unit 19 provides clock signals to CPU 12 and receives a STOP signal via control signals 26. Clock unit 19 also provides system clocks to CPU 12, memory module 16, debug module 20, and other module 18.

BDS 14 also includes serial background communication interface 104 which allows a host development system to be coupled to data processing system 10 (which may also be referred to as the target system). The host development system can therefore perform debug operations via background communication interface 104. In one embodiment, background communication interface 104 may be an asynchronous bi-directional single-wire interface. In this embodiment, BDS 14 needs only one external pin for performing debug operations with the host system. In alternate embodiments, other appropriate communication interfaces may be used, such as a JTAG interface.

Figure 2:
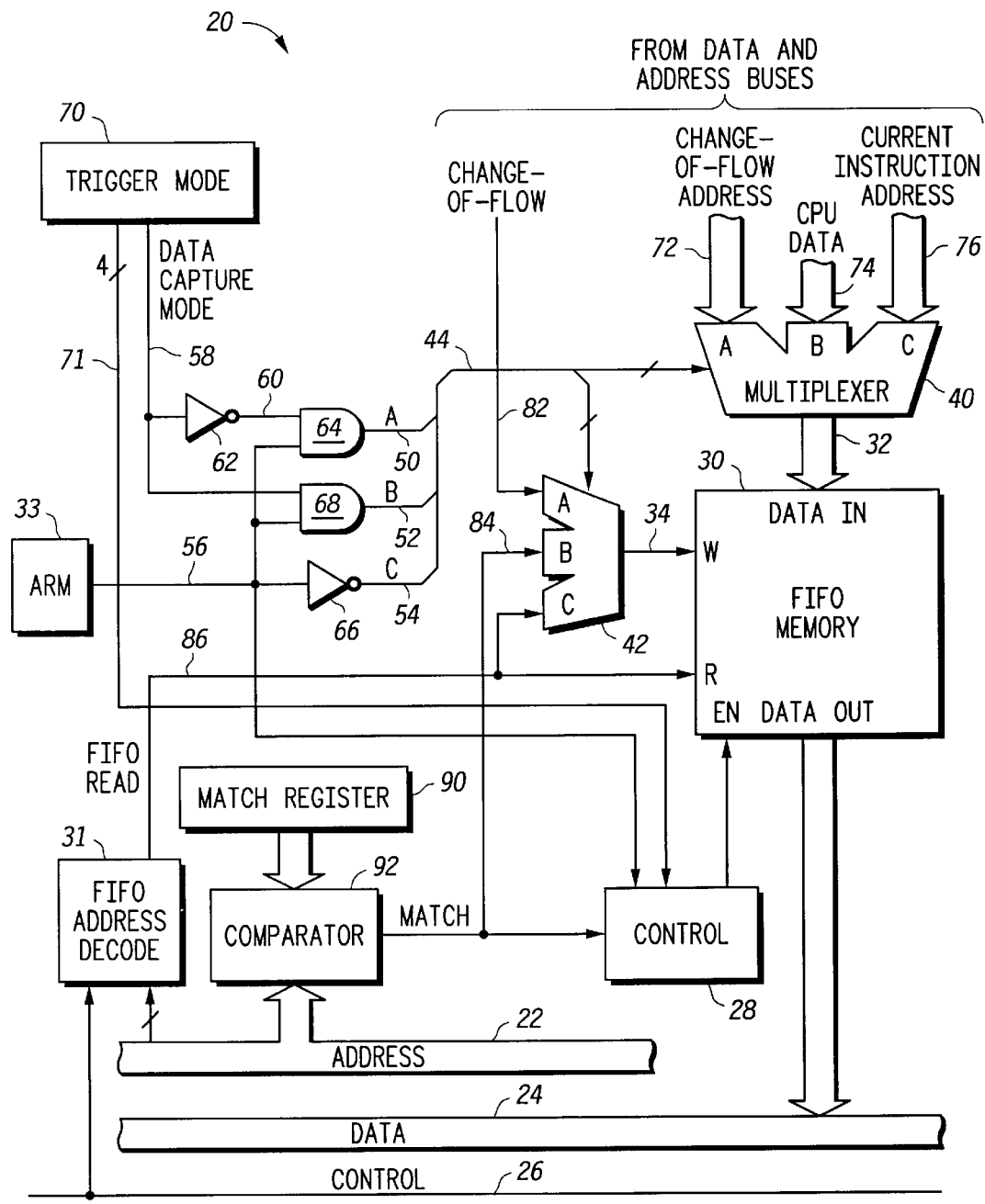
FIG. 2 illustrates a debug module of the data processing system of FIG. 1.

FIG. 2 illustrates debug module 20 of the data processing system 10 of FIG. 1. Debug module 20 includes control block 28, FIFO address decode 31, FIFO memory 30, arm register 33, multiplexers 40 and 42, AND logic gates 64 and 68, inverters 62 and 66, trigger mode register 70, match register 90, and comparator 92.

Generally, trigger mode registers 70 have outputs coupled to inputs of control block 28, and provides a Data capture mode signal 58 to inputs of inverter 62 and AND logic gate 68. Inverter 62 has an output 60 coupled to an input of AND logic gate 64. Arm register 33 has an output coupled to inputs of inverter 66, AND logic gates 64 and 68, and an input of control block 28. Each of logic gates 64, 68 and inverter 66 have outputs coupled to a control bus 44 of multiplexer 40 labeled "A" 50, "B" 52, and "C" 54, respectively. Multiplexer 40 also has an input labeled "A" for receiving CHANGE-OF-FLOW ADDRESS 72, an input labeled "B" for receiving CPU DATA 74, and an input labeled "C" for receiving CURRENT INSTRUCTION ADDRESS 76. Multiplexer 40 has an information bus 32 for providing one of the above inputs to a DATA IN input terminal of FIFO memory 30 based on control signals received at control bus 44.

Multiplexer 42 has an input labeled "A" for receiving a change-of-flow signal 82, an input labeled "B" for receiving a match signal 84 and an input labeled "C" for receiving a FIFO read signal 86 from FIFO address decode 31. Multiplexer 42 has an output 34 for providing one of the above inputs to a terminal of FIFO memory 30 labeled "W" based on control signals from control bus 44. FIFO address decode 31 also has an input coupled to control bus 26, and an input coupled to address bus 22. Comparator 92 has an input coupled to match register 90, an input coupled to address bus 22, and an output for providing the match signal 84 to multiplexer 42 and to control block 28. FIFO memory has an input labeled "R" for receiving FIFO read signal 86, an input labeled "EN" coupled to an output of control block 28, and an output labeled "DATA OUT" coupled to data bus 24.

In operation, debug module 20 captures real time debugging information. FIFO memory 30 receives values from information bus 32 in response to FIFO write signal from output 34 of multiplexer 42. Later, this information can be read onto MCU data bus 24 in response to FIFO read signal 86. The FIFO memory 30 allows information to be captured in real time and read out by an external debug host system (not shown) at a later time for analysis.

Control block 28 receives an input from trigger mode 70, an input from arm register 33, and an input from comparator 92. Control block 28 provides an enable signal to input "EN" on FIFO memory 30 to allow data to be written to FIFO memory 30 based on either trigger mode type 71, comparator 92 MATCH signal 84, or arm register value 56.

One of three types of information can be presented through multiplexer 40 on output 32 depending upon control signals from control bus 44. Note that the FIFO write signal 34 and the output of multiplexer 40 are controlled by signals in control bus 44. Control bus 44 is comprised of control signals 50(A), 52(B), and 54(C) which select one of three inputs to each of multiplexers 40 and 42. Control signal 50(A) selects change-of-flow address bus 72 to multiplexer 40 and change-of-flow signal 82 to multiplexer 42. Control signal 52(B) selects CPU data bus 74 to multiplexer 40 and address match signal 84 to multiplexer 42. Control signal 54(C) selects current instruction address bus 76 to multiplexer 40 and FIFO read signal 86 to multiplexer 42.

When trigger mode register 70 does not select a data capture mode, data capture mode control signal 58 is negated to inverter 62 and the output of inverter 62 is asserted. Provided the FIFO ARM control signal 56 is also asserted, both inputs to AND gate 64 are asserted and control signal 50 at the output of AND gate 64 selects the "A" inputs to multiplexers 40 and 42. In this configuration FIFO memory 30, if enable signal EN is asserted, captures the value from change-of-flow information 72 each time the change-of-flow control signal 82 is asserted. Change-of-flow information 72 is a previously registered version of information from address bus 22.

During software development it is important to trace the flow of a program in order to determine whether the program is performing the desired task correctly. It would be inefficient to capture the address of every instruction because in many cases the address of the next instruction is obvious. It is more efficient to capture only the addresses where a change-of-flow takes place. That is, when the address of the next instruction to execute depends on real time conditions at the time of execution. Examples of change-of-flow include conditional branch instructions (when the branch condition is true), indexed jump instructions where the destination address depends on the current value of an index register at the time the instruction executes, and returns from interrupts and subroutines where the destination address depends on a value recovered from the stack during program execution.

The CPU data capture feature as embodied in debug module 20 is used to capture the data involved in selected accesses to a specific address. When trigger mode register 70 selects a data capture mode, data capture mode control signal 58 is asserted to AND gate 68. Provided the FIFO ARM control signal 56 is also asserted, both inputs to AND gate 68 are asserted and control signal 52 at the output of AND gate 68 selects the B inputs to multiplexers 40 and 42. In this configuration FIFO memory 30, if enable signal EN is asserted, captures the value from CPU data bus 74 each time the address match control signal 84 is asserted. The address match signal 84 is asserted when comparator 92 detects a match between the match register 90 and the address bus 22. CPU data bus 74 is a previously registered version of information from data bus 24.

When the FIFO ARM control signal 56 is negated to inverter 66, the control signal 54 at the output of inverter 66 selects the C inputs to multiplexers 40 and 42. In this configuration FIFO memory 30, if enable signal EN is asserted, captures the value from the current instruction address 76 each time the FIFO read control signal 86 is asserted. Current instruction address 76 is a previously registered version of information from address bus 22. This mode of operation is not dependent on the trigger mode type and is used for a profiling function in the illustrated embodiment.

Collecting statistical information about execution addresses is sometimes called profiling. The present invention allows an external development system (typically a host personal computer connected to the background debug system 14 of data processing system 10) to periodically trigger the capture of the address of the currently executing instruction into on-chip debug FIFO memory 30. By collecting this information over an extended period of time it is possible to develop a profile of where the application program is spending its time. Analysis of this information is useful to the developer of application software.

Debug module 20 allows three types of information to be captured during debug operation. Also, debug module 20 operates autonomously from the CPU and can collect program information in real-time. A FIFO memory is provided for temporary storage of debug information. In addition, the debug information can be retrieved by an external host without having access to the internal data and address buses by using only a serial communication interface, such as for example, serial communication interface 104. Alternatively, the debug information can be retrieved using a software debugger program, or ROM monitor, running in the data processing system itself.

FIG. 3 illustrates one embodiment of BDS 14 of FIG. 1 in more detail. Background communication interface 104, which receives signals from an external host development system (i.e. an external debug host system), is coupled to serial command decoder block 110, command response block 112, synchronization (sync) detect block 114, and synchronization (sync) response block 116. Background debug clock signal 106 controls the timing of operations in serial command decoder block 110, command response block 112, sync detect block 114, and sync response block 116. Command response block 112 is also coupled to data bus 24 and control signals 26 to allow serial background commands to read or write memory and register values or to initiate debug commands such as GO, TRACE, or enter-active-BACKGROUND. Serial command decoder 110 is also coupled to BDM enable circuitry 103 which provides EN_BDM 102.

BDM enable circuitry 103 may include a control register for storing EN_BDM 102 as one of its control bits or may include other circuitry designed to assert EN_BDM 102. In one embodiment, EN_BDM 102 may be a bit stored in a control register that is only accessible by a BDS command issued by a host development system via background communication interface 104. This prevents user code from being able to purposely or inadvertently assert EN_BDM 102 and engage a STOP signal override (not shown). In alternate embodiments, EN_BDM 102 may not be stored as a control bit and may instead be asserted by logic circuitry that detects when valid debug communications are taking place via background communication interface 104. Alternate embodiments may use different mechanisms and circuitries, other than those described in reference to BDM enable circuitry 103, for asserting EN_BDM 102 to enable BDS 14.

During background debug operations, serial commands and data are received via background communication interface 104 and decoded by serial command decoder 110. Serial command decoder 110 may send a command address labeled "COMMAND ADDRESS" to an address generation unit (not shown) which is located in CPU 12. Command response block 112 then performs the requested command using signals in data bus 24 and control signals 26. For some commands, data is written to data processing system 10 via data bus 24 and control signals 26. For other commands, data is read from data processing system 10 via data bus 24 and control signals 26 and sent back to the host development system as a serial data stream over background communication interface 104. In this example protocol, the line coupling a host development system to background communication interface 104 is not asserted low for more than approximately three-fourths of a symbol duration which, in this embodiment, is 16 cycles of the background debug clock 106. (Note that in the description below, background communication interface 104 may also refer to the communication line coupled to background communication interface 104 from the host development system. That is, when coupled to a host development system, background communication interface 104 may also be referred to as background communication line 104.)

Although the invention has been described with respect to specific conductivity types or polarity of potentials, skilled artisans appreciate that conductivity types and polarities of potentials may be reversed. For example, signals designed as active high may be designed as active low, and those designed as active low may be designed as active high. One of ordinary skill in the art would understand how to modify the circuitry to accommodate such changes.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
   a central processing unit (CPU) for executing a plurality of instructions;
   an internal address bus, coupled to the central processing unit, for transmitting address information;
   an internal data bus, coupled to the central processing unit, for transmitting data;
   a memory module, coupled to the internal address bus and to the internal data bus; for storing one of instructions or data; and
   a debug module, coupled to the internal address bus and the internal data bus, for receiving and storing a current instruction address of the plurality of instructions in response to an externally generated request to the data processing system, wherein the debug module sets both a trigger mode and an arm mode to select the current instruction address and the debug module stores the current instruction address in response to both a read signal and an inactive arm signal.

2. The data processing system of claim 1, wherein the current instruction address is stored in the memory module.

3. The data processing system of claim 1, wherein the current instruction address is stored in a first-in, first-out (FIFO) memory.

4. The data processing system of claim 3, wherein the current instruction address is stored in a first-in, first-out memory in response to the read signal, wherein the read signal is a FIFO read control signal.

5. The data processing system of claim 4, wherein the FIFO read control signal is generated in response to the externally generated request.

6. The data processing system of claim 1, further comprising a serial communication interface for providing the current instruction addresses external to the data processing system.

7. The data processing system of claim 1, wherein the debug module receives and stores one of change-of-flow addresses or central processing unit data.

8. The data processing system of claim 7, wherein the debug module receives and stores one of change-of-flow addresses or central processing unit data based on a user defined trigger mode signal.

9. The data processing system of claim 8, wherein the debug module operates autonomously to the central processing unit.

10. The data processing system of claim 9, further comprising a serial communication interface for defining the trigger mode signal and for providing the stored change-of-flow addresses, the CPU data, or the current instruction address external to the data processing system.

11. The data processing system of claim 7, wherein the change-of-flow addresses or central processing unit data are retrieved from the debug module by a software debugger program running on the data processing system.

12. A data processing system, comprising:
   a central processing unit (CPU) for executing a plurality of instructions;
   an internal address bus, coupled to the central processing unit, for transmitting address information;
   an internal data bus, coupled to the central processing unit, for transmitting data;
   a memory module, coupled to the internal address bus and to the internal data bus; for storing one of instructions or data; and
   a debug module, coupled to the internal address bus and the internal data bus, for receiving and storing one of a change-of-flow address, CPU data, or a current instruction address of the plurality of instructions in response to an externally generated request to the data processing system, wherein the debug module sets both a trigger mode and an arm mode select one of either the change-of-flow address, the CPU data, or the current instruction address and the debug module stores the current instruction address in response to both a read signal and an inactive arm signal.

13. The data processing system of claim 12, wherein the current instruction address is stored in a first-in, first-out (FIFO) memory.

14. The data processing system of claim 13, wherein the current instruction address is stored in a first-in, first-out memory in response to the read signal, wherein the read signal is a FIFO read control signal.

15. The data processing system of claim 14, wherein the FIFO read control signal is generated in response to the externally generated request.

16. The data processing system of claim 12, further comprising a serial communication interface for providing one of either the change-of-flow addresses, CPU data, or current instruction address to a host processor external to the data processing system.

17. The data processing system of claim 12, wherein the debug module operates autonomously to the central processing unit.

18. A method for storing debug information in a data processing system, the method comprising the steps of:
   setting both a trigger mode and an arm mode to select one of either change-of-flow addresses, central processing unit (CPU) data, or current instruction addresses;
   comparing an address from the CPU to a predetermined address, and in response to a favorable comparison, storing change-of-flow addresses in a memory when in a first trigger mode;
   storing CPU data addresses in the memory in response to a second trigger mode signal;
   storing current instruction addresses in the memory in response to both a read signal and an inactive arm signal; and
   outputting the memory contents to an external system.

19. The method of claim 18, wherein the steps of storing further includes the steps of storing in a first-in, first-out (FIFO) memory.

20. The method of claim 18, wherein the step of outputting comprises serially outputting the memory contents.

* * * * *